US010290190B2

(12) United States Patent
Howard et al.

(10) Patent No.: US 10,290,190 B2
(45) Date of Patent: May 14, 2019

(54) PROVIDING TEMPERATURE SENSATION TO A USER BASED ON CONTENT PRESENTED TO THE USER

(71) Applicant: Facebook, Inc., Menlo Park, CA (US)

(72) Inventors: Zachary Ian Howard, San Francisco, CA (US); Erich James Owens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/664,922

(22) Filed: Jul. 31, 2017

(65) Prior Publication Data

US 2019/0035234 A1    Jan. 31, 2019

(51) Int. Cl.
*G06F 3/147* (2006.01)
*G08B 6/00* (2006.01)
*G08B 5/22* (2006.01)
*G06T 11/00* (2006.01)

(52) U.S. Cl.
CPC .............. *G08B 6/00* (2013.01); *G06F 3/147* (2013.01); *G06T 11/001* (2013.01); *G08B 5/22* (2013.01)

(58) Field of Classification Search
CPC .......... G06F 1/163; H01L 35/28; H01L 35/30
See application file for complete search history.

(56) References Cited

U.S. PATENT DOCUMENTS

| | | | |
|---|---|---|---|
| 7,830,361 B2 | 11/2010 | Muraki | |
| 9,183,574 B2 | 11/2015 | Bosworth et al. | |
| 2003/0210259 A1 | 11/2003 | Liu et al. | |
| 2011/0291953 A1* | 12/2011 | Cheok | G06Q 10/06 345/173 |
| 2012/0258800 A1* | 10/2012 | Mikhailov | G06F 3/016 463/37 |
| 2013/0120290 A1* | 5/2013 | Yumiki | G06F 3/041 345/173 |
| 2013/0135214 A1 | 5/2013 | Li et al. | |
| 2017/0084137 A1* | 3/2017 | Coish | G08B 6/00 |

FOREIGN PATENT DOCUMENTS

| | | |
|---|---|---|
| KR | 10-0860412 B1 | 9/2008 |
| KR | 10-2013-0101395 A | 9/2013 |

OTHER PUBLICATIONS

PCT International Search Report and Opinion, PCT Application No. PCT/US2017/063543, dated Apr. 24, 2018, seventeen pages.
European Patent Office, European Search Report and Opinion, European Patent Application No. 18167490.4, dated Oct. 16, 2018, eight pages.

* cited by examiner

*Primary Examiner* — Thomas J Lett

(74) *Attorney, Agent, or Firm* — Fenwick & West LLP

(57) ABSTRACT

A controller including a temperature feedback mechanism is coupled to a client device. The temperature feedback mechanism is configured to be heated or cooled based on instructions received from the client device and contacts a portion of a user's body. In various embodiments, the temperature feedback mechanism is a Peltier device integrated into the controller. Various applications executing on the client device may implement instructions that, when executed by the client device, heat or cool the controller coupled to the client device to augment other content presented by an application.

22 Claims, 3 Drawing Sheets

PROVIDING TEMPERATURE SENSATION TO A USER BASED ON CONTENT PRESENTED TO THE USER

BACKGROUND

This disclosure relates generally to presenting content via a user interface and more specifically to augmenting content displayed to a user by providing a temperature sensation to the user.

Increasingly, client devices present content to users representing a virtual environment allowing the user to interact with various objects within the virtual environment. Conventional client devices emphasize visual presentation of content to users so the users may see the virtual environment or see the users' surroundings augmented with virtual content. Audio content may augment the visual presentation of content through speakers or other audio playback devices to enhance a virtual environment presented to the user.

However, content presented to users via a client device may benefit from providing additional sensory feedback to a user. For example, providing haptic feedback along with visual and audio data allows a user to become more fully immersed in the presented content. As an example, haptic feedback allows a user to more fully simulate interactions with virtual objects displayed to a user, allowing the user to more effectively interact with the presented content. Providing haptic feedback to a user may also allow a client device to expose a user to temperature changes that further increase the realism of content presented to the user by the client device. Traditional heat transfer interfaces rely on heat transfer such as conduction, diffusion, convection, and radiation. Accordingly, traditional heat transfer devices are often physically connected to an external heat source and heat sink and have a high thermal conductivity to conduct heat from the heat source to an external environment. However, in many applications, use of high thermal conductivity and an external heat source prevents traditional heat transfer devices from being easily wearable.

SUMMARY

A client device presents content to a user via a display device, which may be included in the client device or coupled to the client device. One or more applications executing on the client device obtain the content presented via the display device. Additionally, the client device is coupled to a controller that includes a temperature feedback mechanism. A surface of the temperature feedback mechanism is configured to contact a portion of the user when the controller is in operation. Based on one or more characteristics of content presented by the display device, the client device provides instructions to the controller to modify a temperature of the surface of the temperature feedback mechanism contacting the portion of the user.

In various embodiments, the temperature feedback device included in the controller is a thermoelectric device configured to convert a voltage (or a current) into a temperature difference. For example, the temperature feedback device is a Peltier device configured to transfer heat between surfaces when a voltage is applied to the temperature feedback mechanism. For example, the temperature feedback mechanism comprises a surface configured to contact a portion of the user and an additional surface separated from the surface by a distance. Different types of conductors electrically coupled to each other in series couple the surface to the additional surface; however, the different types of conductors are thermally coupled in parallel. The conductors are selected so the different types of conductors have complementary Peltier coefficients. A voltage source is coupled to the additional surface and configured to apply a voltage to the additional surface that causes current to flow through the conductors and the conductors.

Depending on the direction of the current flow through the conductors and conductors, heat is transferred between the surface and the additional surface. Thus, when a voltage is applied to the additional surface, current flows in a direction between the conductors that directs heat from the additional surface to the surface, increasing a temperature of the surface. Conversely, applying an alternative voltage, which is reversed in polarity from the voltage, to the additional surface causes current to flow in an opposite direction between the conductors, which directs heat from the surface to the additional surface, decreasing the temperature of the surface. As the surface is configured to contact the portion of the user, modifying the temperature of the surface increases or decreases the portion of the user contacting the surface, allowing the temperature feedback mechanism to provide the user with sensations of hot or cold based on voltages applied to the additional surface by the voltage source.

Content presented to the user via the display device includes an object, or other portion of content, having a particular characteristic specifying application of temperature feedback to the user to whom the content is presented. In some embodiments, the presented content includes an object having a characteristic specifying a temperature of the object. For example, a characteristic of an object presented by the display device specifies a temperature applied to a portion of the user when the object is presented to the user. In some embodiments, the characteristic also specifies a location within the display device or a format in which the object is presented via the display device when the temperature is applied to the portion of the user. The presented content may alternatively include a characteristic specifying a sensation of heat or a sensation of cold to apply to the portion of the user when the object is presented by the display device allowing the characteristic to specify a relative temperature rather than a specific temperature applied to the portion of the user.

In other embodiments, an application presenting the content via the display device associates a characteristic of the user with temperature feedback. For example, the presented content is content items received from an online system maintaining connections between various users, and an application executing on the client device to present the content items associates temperature feedback with an affinity of the user to whom the content items are presented with an additional user associated with the content item by the online system. For example, if the user to whom a content item is presented has greater than a threshold affinity, determined by the online system, for an additional user associated with the content item, the application presenting the content item associates temperature feedback of heat with the content item. As another example, if the user to whom another content item is presented has less than an additional threshold affinity, determined by the online system, for another user associated with the other content item, the application presenting the content item associates temperature feedback of cold with the content item.

The application executing on the client device and presenting the content item determines a temperature based on the particular characteristic of the object. The client device transmits an instruction including the determined temperature to the controller. Based on the received instruction, the controller modifies a temperature of the surface of the temperature feedback mechanism contacting the portion of the user's body. Based on the instruction, the temperature feedback mechanism applies a voltage to an additional surface that does not contact the portion of the user. Based on the applied voltage, heat is removed from the additional surface and directed to the surface contacting the portion of the user, which heats the surface contacting the portion of the user to provide the user with a sensation of heat. Conversely, the applied voltage removes heat from the surface contacting the portion of the user's body and directs the heat to the additional surface, which cools the surface contacting the portion of the user to provide the user with a sensation of cold. Hence, the controller allows the client device to augment content presented by a display device with a corresponding temperature sensation for the user, increasing user engagement with the presented content.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
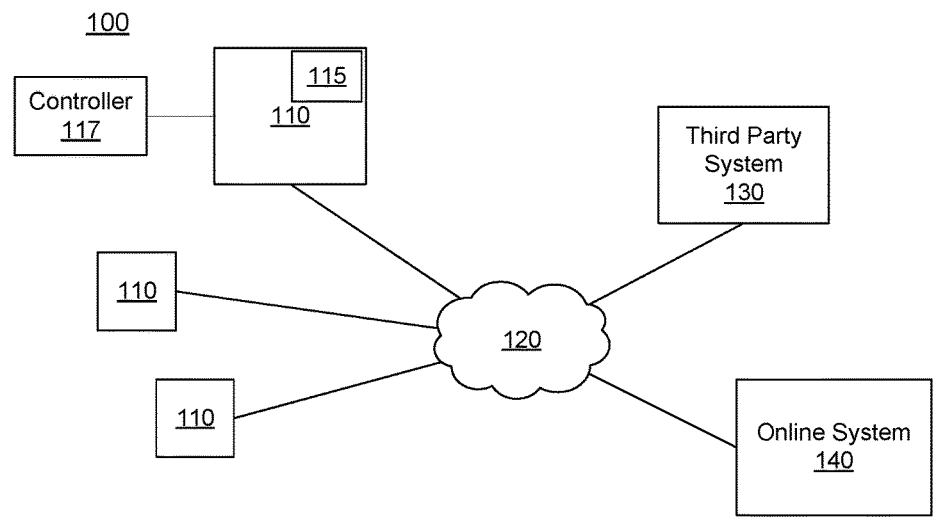
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

Various client devices 110 include display devices 115, which may be integrated into a client device 110 or coupled to a client device 110. For example, a display device 115 integrated into a client device 110 is a display screen included in the client device 110. Alternatively, the display device 115 is a monitor or other display coupled to the client device 110. In other embodiments, the display device 115 is included in a headset or head mounted device (HMD) coupled to the client device 110 and configured to be worn on a user's head. Such a headset or HMD may include additional components that position the display device 115 relative to a user's eyes so content presented by the display device 115 presents a virtual environment to the user. Alternatively, the display device 115 is integrated into the client device 110, and the client device 110 is positioned within a headset or HMD so the display device 115 integrated into the client device 110 is positioned relative to the user's eyes so content presented by the display device 115 presents a virtual environment to the user. Content presented by the display device 115 is determined by an application executing on the client device 110. Different applications may be included on the client device 110, so execution of different applications changes the content presented by the user by the display device 115.

Additionally, a controller 117 is coupled to a client device 110, with a surface of the controller 117 configured to contact a portion of the user. As further described below in conjunction with FIG. 2, the surface of the controller 117 contacting the portion of the user comprises a temperature feedback mechanism configured to provide temperature feedback to the portion of the user in response to instructions received from the client device 110. For example, in response to receiving an instruction from the client device 110 to provide a sensation of heat to the portion of the user, the controller 117 configures the temperature feedback mechanism to increase a temperature of the surface contacting the portion of the user. Similarly, in response to receiving an instruction from the client device 110 to provide a sensation of cold to the portion of the user, the controller 117 configures the temperature feedback mechanism to decrease the temperature of the surface contacting the portion of the user. As further described below in conjunction with FIG. 3, the instructions received by the controller 117 from the client device 110 are based on content presented by the display device 115 of the client device 110, allowing the controller 117 to augment the content presented by the display device 115 to enhance a user's engagement with the presented content. For example, if the content presented by the display device 115 presents a virtual environment to the user, the client device 110 provides instructions to modify the temperature of the surface of the controller 117 contacting the portion of the user based on characteristics (e.g., a characteristic specifying temperature) of objects within the virtual world within a threshold distance of the position of the user in the virtual world. As another example, an application executing on the client device 110 and presenting information received from the online system 140 generates instructions for the controller 117 to modify the temperature applied to the portion of the user based on the received information and communicates the instructions to the controller 117.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
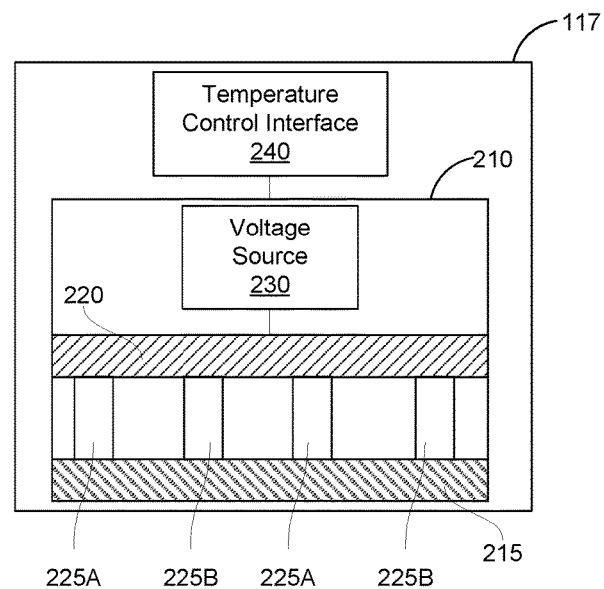
FIG. 2 is a block diagram of a controller providing temperature feedback to a user of a client device, in accordance with an embodiment.

FIG. 2 is a block diagram of one embodiment of a controller 117 coupled to a client device 110. In the example shown by FIG. 2, the controller 117 includes a temperature feedback mechanism 210 and a temperature control interface 240 coupled to the temperature feedback mechanism 210. However, in other embodiments, the controller 117 may include additional, fewer, or different components for various applications.

For purposes of illustration FIG. 2 shows an example temperature feedback mechanism 210 comprising a Peltier device configured to transfer heat between surfaces in response to application of a voltage to the temperature feedback mechanism 210; however in other embodiments, the temperature feedback mechanism 210 may be any suitable thermoelectric device configured to convert a voltage (or a current) into a temperature difference. In the example of FIG. 2, the temperature feedback mechanism 210 comprises a surface 215 configured to contact a portion of a user and an additional surface 220 separated from the surface 215 by a distance. The surface 215 is coupled to the additional surface 220 via different types of conductors 225A, 225B. Conductors 225A and conductors 225B have different properties, and the example of FIG. 2 shows the surface 215 coupled to the additional surface 220 where conductors 225A and conductors 225B are electrically coupled in series and thermally coupled in parallel. For example, a conductor 225A is a p-type semiconductor and the conductor 225B is an n-type semiconductor, or vice versa. However, in various embodiments, the conductor 225A and the conductor 225B are selected to have complementary Peltier coefficients.

A voltage source 230 is coupled to the additional surface 220 and configured to apply a voltage to the additional surface 220 that causes current to flow through the conductors 225A and the conductors 225B. In various embodiments, the voltage source 230 includes an H-bridge that allows a voltage to be applied to the additional surface 220 in different polarities. Depending on the direction of the current flow through the conductors 225A and conductors 225B, heat is removed from one of the surface 215 and the additional surface 220 and repositioned at the other one of the surface 215 and the additional surface 220. Thus, the voltage source 230 applying a voltage to the additional surface 220 causing current to flow in a direction between conductors 225A and conductors 225B causes heat to be removed from the additional surface 220 and deposited on the surface 215, increasing a temperature of the surface 215; conversely, the voltage source 230 applying an alternative voltage, which has an opposite polarity to a polarity of the voltage in the previous example, to the additional surface 220 causing current to flow in an alternative direction, which is opposite the direction of the current flow when the voltage is applied, between conductors 225A and conductors 225B causes heat to be removed from the surface 215 and deposited on the additional surface 220, decreasing the temperature of the surface 215. As the surface 215 is configured to contact the portion of the user, the portion of the user experiences a temperature increase or a temperature decrease based on the increase or decrease of the temperature of the surface 215. This allows the temperature feedback mechanism 210 to provide the user with sensations of hot or cold based on voltages applied to the additional surface 220 by the voltage source 230.

A temperature control interface 240 is coupled to the voltage source 230 in the embodiment shown by FIG. 2. The temperature control interface 240 is configured to receive instructions from the client device 110 and provide one or more control signals to the voltage source 230 based on the received instructions. For example, an instruction received by the temperature control interface 240 specifies heating the surface 215 of the temperature feedback mechanism 210 contacting the portion of the user, so the temperature control interface 240 provides a control signal to the voltage source 230 causing application of a voltage to the additional surface 220 of the temperature feedback mechanism 210 causing the temperature of the surface 215 to increase. As another example, an instruction received by the temperature control interface 240 specifies cooling the surface 215 of the temperature feedback mechanism 210 contacting the portion of the user, so the temperature control interface 240 provides a control signal to the voltage source 230 causing application of an alternative to the additional surface 220 of the temperature feedback mechanism 210 causing the temperature of the surface 215 to decrease.

In some embodiments, the temperature control interface 240 is thermally coupled to the surface 215 of the temperature feedback mechanism 210 contacting the portion of the user and determines a temperature of the surface 215 via the thermal coupling. Alternatively, the temperature control interface 240 is configured to determine the temperature of the surface 215 of the temperature feedback mechanism 210 contacting the portion of the user through any suitable mechanism (e.g., infrared detection of the temperature of the surface 215). Based on the temperature of the surface 215 the temperature control interface 240 provides one or more control signals to the voltage source 230 to increase, decrease, or cease modification of the surface 215 of the temperature feedback mechanism 210 contacting the portion of the user. For example, an instruction received by the temperature control interface 240 specifies a particular temperature for the surface 215 of the temperature feedback mechanism 210 contacting the portion of the user. When the temperature control interface 240 determines the temperature of the surface 215 reaches the particular temperature, the temperature control interface 240 provides an additional control signal to the voltage source 230 that ceases application of voltage to the additional surface 220 or that reduces voltage applied to the additional surface 220. Hence, the temperature control interface 240 includes a feedback mechanism with the surface 215 of the temperature feedback mechanism 210 contacting the portion of the user in various embodiments to more particularly regulate the temperature sensation provided to the portion of the user contacting the surface 215 of the temperature feedback mechanism 210.

Figure 3:
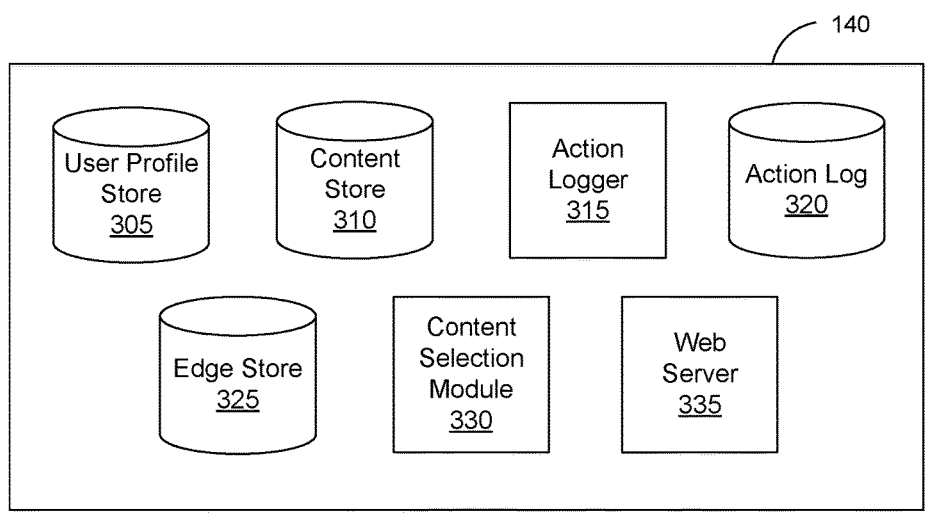
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 315 receives communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

The content selection module 330 includes instructions for modifying a temperature of a surface of a controller 117 coupled to a client device 110 in various embodiments. As further described above in conjunction with FIGS. 1 and 2, the surface of the controller 117 is configured to contact a portion of a user, so modifying the temperature of the surface provides the user with a sensation of hot or cold. To allow the client device 110 presenting content to modify the temperature of the surface of the controller 117 coupled to the client device 110, the content selection module 330 maintains instructions that are communicated to the client device 110 along with a content item or other content. The instructions convert one or more characteristics of content to instructions for communication to the controller 117. For example, the instructions maintained by the client device 110 include mappings between values of a particular characteristic of a content item to a temperature of the surface of the controller 117 contacting the portion of the body. The included mappings may further associate instructions communicated to the controller 117 to modify the temperature of the surface of the controller 117 to the determined temperature. Alternatively, the instructions maintained by the content selection module 330 are instructions for communication to the controller 117 to modify the surface of the controller 117 coupled to the client device 110 that are independent of characteristics of content, so the content selection module 330 may provide various third party systems 130 with instructions for interacting with the controller 117 to modify the surface of the controller 117 configured to contact the portion of the user. In various embodiments, the content selection module 330 provides the instructions to various third party systems 130, allowing the third party systems 130 to provide content capable of modifying the temperature of the surface of the controller 117 based on attributes of the content.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Figure 4:
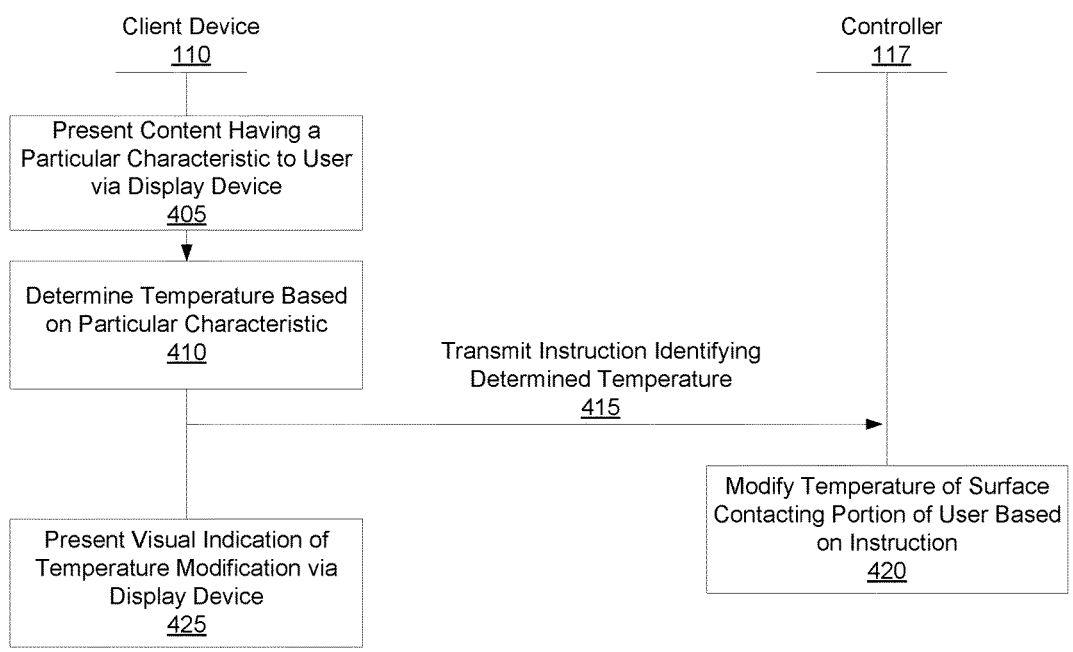
FIG. 4 is an interaction diagram of a method of providing temperature feedback to a user of a client device based on content presented by a display of the client device, in accordance with an embodiment.

Providing Sensations of Temperature to a User Based on Content Presented to the User FIG. 4 is an event diagram of a method of providing temperature feedback to a user of a client device 110 based on content presented by a display of the client device 110. In various embodiments, the steps described in conjunction with FIG. 4 may be performed in different orders. Additionally, in some embodiments, the method may include different and/or additional steps than those shown in FIG. 4.

The client device 110 presents 405 content to the user having a particular characteristic via a display device 115 of a client device 110 coupled to a controller 117. As further described above in conjunction with FIG. 1, the display device 115 may be included in the client device 110 or coupled to the client device 110, and the controller 117 includes a temperature feedback mechanism 210 having a surface configured to contact a portion of the user. The content is generated by an application executing on the client device 110 and presented 405 by the display device 115 in some embodiments. Alternatively, an application executing on the client device 110 receives the content from an online system 140 or from a third party system 130 and presents 405 the content to the user via the display device 115.

The presented content has a particular characteristic specifying application of temperature feedback to the user to whom the content is presented. In some embodiments, the presented content includes an object having a characteristic specifying a temperature of the object. For example, a characteristic of an object presented by the display device 115 specifies a temperature applied to a portion of the user when the object is presented to the user. In some embodiments, the characteristic also specifies a location within the display device 115 or a format in which the object is presented via the display device 115 when the temperature is applied to the portion of the user. Alternatively, the presented content includes a characteristic specifying a sensation of heat or a sensation of cold to apply to the portion of the user when the object is presented by the display device 115, allowing the characteristic to specify a relative temperature rather than a specific temperature applied to the portion of the user.

Alternatively, an application presenting the content via the display device 115 associates a characteristic of the user with temperature feedback. For example, the presented content is content items received from an online system 140 maintaining connections between various users, and an application executing on the client device 110 to present the content items associates temperature feedback with an affinity of the user to whom the content items are presented 405 with an additional user associated with the content item by the online system 140. For example, if the user to whom a content item is presented 405 has greater than a threshold affinity, determined by the online system 140, for an additional user associated with the content item, the application presenting 405 the content item associates temperature feedback of heat with the content item. As another example, if the user to whom another content item is presented 405 has less than an additional threshold affinity, determined by the online system 140, for another user associated with the other content item, the application presenting 405 the content item associates temperature feedback of cold with the content item.

The application executing on the client device 110 and presenting 405 the content item determines 410 a temperature based on the particular characteristic of the object. In some embodiments, the particular characteristic identifies a specific temperature or a temperature relative to the user's body (i.e., hot or cold), so the application extracts the temperature from the particular characteristic. Alternatively, the application includes information associating temperatures with different values or ranges of values of the particular characteristic, so the application determines a value of the particular characteristic of the object and determines 410 a temperature associated with the value or associated with a range including the value. The client device 110 transmits 415 an instruction including the determined temperature to the controller 117.

Based on the received instruction, the controller 117 modifies 420 a temperature of the surface of the temperature feedback mechanism 210 contacting the portion of the user's body. As further described above in conjunction with FIG. 2, based on the instruction, the temperature feedback mechanism 210 applies a voltage to an additional surface that does not contact the portion of the user. Based on the applied voltage, heat is removed from the additional surface and directed to the surface contacting the portion of the user, which heats the surface contacting the portion of the user to provide the user with a sensation of heat. Conversely, the applied voltage removes heat from the surface contacting the portion of the user's body and directs the heat to the additional surface, which cools the surface contacting the portion of the user to provide the user with a sensation of cold. Operation of the temperature feedback mechanism 210 to modify the temperature of the surface contacting the portion of the user based on the received instruction is further described above in conjunction with FIG. 2.

In some embodiments, the client device 110 also presents 425, via the display device 115, a visual indication of the temperature modification of the surface contacting the portion of the user. For example, the client device 110 modifies an appearance of the object via the display device 115 based on the temperature determined 410 from the particular characteristic. As an example, the client device 110 outlines the object on the display device 115 in a particular color if the determined temperature corresponds to increasing the temperature of the surface contacting the portion of the user and outlines the object on the display device 115 in an alternative color if the determined temperature corresponds to decreasing the temperature of the surface contacting the portion of the user. In another example, the client device 110 presents 425 additional content proximate to the object based on the temperature modification of the surface contacting the portion of the user. Different additional content is presented based on whether the temperature of the surface contacting the portion of the user is decreased or is increased. Alternatively, the client device 110 receives an indication that the temperature of the surface of the temperature feedback mechanism 210 contacting the portion of the user is being modified from the controller 117 and presents 425 the visual indication of the temperature modification, as further described above, in response to the indication.

In some embodiments, the client device 110 ceases presenting 425 the visual indication of the temperature modification of the surface of the temperature feedback mechanism 210 contacting the portion of the user in response to receiving an indication from the controller 117 that the surface of the temperature feedback mechanism 210 contacting the portion of the user has reached a threshold temperature or in response to receiving an indication from the controller 117 that the temperature of the surface of the temperature feedback mechanism 210 contacting the portion of the user has been modified for at least a threshold amount of time. Similarly, the client device 110 ceases presenting 425 the visual indication of the temperature modification of the surface of the temperature feedback mechanism 210 contacting the portion of the user when one or more characteristics of the object's presentation via the client device 115 have changed. For example, when the object is presented in a different location of the display device 115, the visual indication of the temperature modification of the surface of the temperature feedback mechanism 210 contacting the portion of the user is no longer presented 425. Additionally, the display device 110 communicates another instruction to the controller 117 to cease modification of the temperature of the surface of the temperature feedback mechanism 210 contacting the portion of the user when the one or more characteristics of the object's presentation via the display device 115 change. In other embodiments, the display device 110 communicates another instruction to the controller 117 to modify the temperature of the surface of the temperature feedback mechanism 210 contacting the portion of the user to a default temperature when the one or more characteristics of the object's presentation via the display device 115 change.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
   a client device configured to execute an application presenting content to a user via a display device; and
   a controller coupled to the client device, the controller including a temperature feedback mechanism having a surface configured to contact a portion of the user and configured to:
   receive an instruction from the application executing on the client device when the application presents specific content to the user via the display device of the client device;

modify a temperature of the surface contacting the portion of the user in response to the received instruction;
determine the temperature of the surface contacting the portion of the user; and
cease modification of the temperature of the surface contacting the portion of the user in response to the temperature of the surface contacting the portion of the user reaches a temperature specified by the received instruction.

2. The system of claim 1, wherein the temperature feedback mechanism comprises a Peltier device having an additional surface coupled to the surface configured to contact the portion of the user via different conductors electrically coupled in series to each other.

3. The system of claim 2, wherein the temperature feedback mechanism is configured to modify the temperature of the surface contacting the portion of the user in response to the received instruction by:
applying a voltage to the additional surface that causes heat to transfer from the surface configured to contact the portion of the user to the additional surface in response to the instruction specifying cooling the portion of the user; and
applying an alternative voltage to the additional surface that causes heat to transfer from the additional surface to the surface configured to contact the portion of the user in response to the instruction specifying heating the portion of the user.

4. The system of claim 1, wherein the instruction from the application executing on the client device when the application presents specific content to the user comprises an instruction to increase the temperature of the surface contacting the portion of the user in response to the client device presenting content having a characteristic associated with heat.

5. The system of claim 1, wherein the instruction from the application executing on the client device when the application presents specific content to the user comprises an instruction to decrease the temperature of the surface contacting the portion of the user in response to the client device presenting content having a characteristic associated with cold.

6. The system of claim 1, wherein the client device is further configured to receive an indication of the modification of the temperature of the surface contacting the portion of the user from the controller and to present a visual indication of the modification of the temperature of the surface contacting the portion of the user via the display device of the client device.

7. The system of claim 1, wherein the client device is further configured to present a visual indication of the modification of the temperature of the surface contacting the portion of the user via the display device of the client device based on a characteristic of the specific content associated with a temperature of the specific content.

8. A method comprising:
presenting content to a user via a display device coupled to a client device, the content including specific content having a particular characteristic specifying application of temperature feedback;
determining a temperature based on the particular characteristic of the specific content by:
extracting a value of the particular characteristic; and
determining a stored temperature associated with the extracted value of the particular characteristic;
transmitting an instruction identifying the determined temperature to a controller coupled to the client device, the controller including a temperature feedback mechanism having a surface configured to contact a portion of the user and to modify a temperature of the surface based on the instruction; and
presenting a visual indication of modification of the temperature of the surface via the display device based on the particular characteristic of the specific content.

9. The method of claim 8, wherein determining the temperature based on the particular characteristic of the specific content comprises:
extracting a particular temperature from the particular characteristic.

10. The method of claim 8, wherein the particular characteristic comprises an affinity of the user for an additional user associated with the specific content obtained from an online system.

11. The method of claim 10, wherein transmitting the instruction identifying the determined temperature to the controller coupled to the client device comprises:
transmitting an instruction to increase the temperature of the surface in response to the affinity of the user for the additional user associated with the specific content being greater than a threshold; and
transmitting an alternative instruction to decrease the temperature of the surface in response to the affinity of the user for the additional user associated with the specific content being less than an additional threshold.

12. The method of claim 8, wherein presenting the visual indication of modification of the temperature of the surface via the display device based on the particular characteristic of the specific content comprises:
outlining the specific content in a particular color in response to the transmitted instruction specifying increasing the temperature of the surface; and
outlining the specific content in an alternative color in response to the transmitted instruction specifying decreasing the temperature of the surface.

13. The method of claim 8, wherein presenting the visual indication of modification of the temperature of the surface via the display device based on the particular characteristic of the specific content comprises:
presenting additional content proximate to the specific content via the display device in response to the transmitted instruction specifying increasing the temperature of the surface; and
presenting different additional content proximate to the specific content via the display device in response to the transmitted instruction specifying decreasing the temperature of the surface.

14. The method of claim 8, further comprising cease presenting a visual indication of the modification of the temperature of the surface contacting the portion of the user via the display device of the client device in response to receiving at least one of the following indications from the controller, the indications comprising:
the temperature of the surface contacting the portion of the user has reached a threshold temperature; and
the temperature of the surface contacting the portion of the user has been modified at least a threshold number of times.

15. The method of claim 8, further comprising cease presenting a visual indication of the modification of the temperature of the surface contacting the portion of the user via the display device of the client device when one or more characteristics of the presented content changes.

16. The method of claim 8, further comprising specifying a location within the display device during temperature modification of the surface contacting the portion of the user based on a characteristic of the specific content associated with a temperature of the specific content.

17. The method of claim 8, further comprising specifying a format in which the object is presented during temperature modification of the surface contacting the portion of the user based on a characteristic of the specific content associated with a temperature of the specific content.

18. The method of claim 8, further comprising presenting additional content proximate to the presented content, the additional content based on the temperature modification of the surface contacting the portion of the user.

19. A non-transitory computer program product comprising a computer readable storage medium having instructions encoded thereon that, when executed by a processor, cause the processor to:
present content to a user via a display device coupled to a client device, the content including specific content having a particular characteristic specifying application of temperature feedback;
determine a temperature based on the particular characteristic of the specific content by:
extracting a value of the particular characteristic; and
determining a stored temperature associated with the extracted value of the particular characteristic;
transmit an instruction identifying the determined temperature to a controller coupled to the client device, the controller including a temperature feedback mechanism having a surface configured to contact a portion of the user and to modify a temperature of the surface based on the instruction; and
present a visual indication of modification of the temperature of the surface via the display device based on the particular characteristic of the specific content.

20. The computer program product of claim 19, wherein the particular characteristic comprises an affinity of the user for an additional user associated with the specific content obtained from an online system.

21. The computer program product of claim 20, wherein transmit the instruction identifying the determined temperature to the controller coupled to the client device comprises:
transmit an instruction to increase the temperature of the surface in response to the affinity of the user for the additional user associated with the specific content being greater than a threshold; and
transmit an alternative instruction to decrease the temperature of the surface in response to the affinity of the user for the additional user associated with the specific content being less than an additional threshold.

22. A controller system comprising:
a temperature feedback mechanism having a surface configured to contact a portion of a user, the controller configured to:
receive an instruction from an application executing on a client device when the application presents specific content to the user via a display device of the client device;
modify a temperature of the surface contacting the portion of the user in response to the received instruction;
determine the temperature of the surface contacting the portion of the user; and
cease modification of the temperature of the surface contacting the portion of the user in response to the temperature of the surface contacting the portion of the user reaches a temperature specified by the received instruction.

\* \* \* \* \*